US005110252A

United States Patent [19]

Aoki

[11] Patent Number: 5,110,252

[45] Date of Patent: May 5, 1992

[54] WHEELCHAIR LIFT FOR TRANSIT VEHICLES HAVING ELEVATED PASSENGER COMPARTMENT FLOOR

[75] Inventor: Lawrence S. Aoki, Modesto, Calif.

[73] Assignee: Hogan Mfg., Inc., Escalon, Calif.

[21] Appl. No.: 528,744

[22] Filed: May 24, 1990

[51] Int. Cl.[5] .......... B60P 1/44

[52] U.S. Cl. .......... 414/549; 414/917; 414/921

[58] Field of Search .......... 414/540, 541, 545, 546, 414/549, 556, 917, 921

[56] References Cited

U.S. PATENT DOCUMENTS

| | | | |
|---|---|---|---|
| 461,156 | 10/1891 | Barber | 105/10 |
| 2,498,161 | 2/1950 | Hamilton | 414/545 |
| 2,732,960 | 1/1956 | Nilson | 414/549 |
| 3,174,634 | 3/1965 | Peck | 414/540 |
| 3,572,754 | 3/1971 | Fowler | 280/166 |
| 3,700,123 | 10/1972 | Corley, Jr. | 414/917 X |
| 3,888,463 | 6/1975 | O'Brien et al. | 414/921 X |
| 3,913,497 | 10/1975 | Maroshick | 105/447 |
| 4,026,387 | 5/1977 | Abreu | 414/541 X |
| 4,027,807 | 6/1977 | Thorley | 414/445 |
| 4,039,091 | 8/1977 | Adamski et al. | 414/556 |
| 4,058,228 | 11/1977 | Hall | 414/549 |
| 4,081,091 | 3/1978 | Thorley | 414/545 |
| 4,083,429 | 4/1978 | Abbott | 414/541 X |
| 4,096,955 | 6/1978 | Dake | 414/541 |
| 4,124,097 | 11/1978 | Kawks et al. | 414/540 X |
| 4,124,100 | 11/1978 | Hawks | 414/504 X |
| 4,133,437 | 1/1979 | Gates | 414/541 |
| 4,134,504 | 1/1979 | Salas et al. | 414/921 X |
| 4,176,999 | 12/1979 | Thorley | 414/540 |
| 4,180,366 | 12/1979 | Roth et al. | 414/540 |
| 4,214,849 | 7/1980 | Downing | 414/545 |
| 4,232,488 | 11/1980 | Hanley | 52/7 |
| 4,251,179 | 2/1981 | Thorley | 414/545 |
| 4,273,217 | 6/1981 | Kajita | 414/921 X |
| 4,278,389 | 7/1981 | Konkle | 414/540 |
| 4,281,744 | 8/1981 | Koerber | 414/540 X |
| 4,325,668 | 4/1982 | Julian et al. | 414/546 |
| 4,347,030 | 8/1982 | Kingston | 414/546 X |
| 4,381,899 | 5/1983 | Merkle | 414/556 |
| 4,441,850 | 4/1984 | Thorley | 414/545 |
| 4,457,402 | 7/1984 | Del Vecchio et al. | 414/921 X |
| 4,466,771 | 8/1984 | Thorley et al. | 414/921 X |
| 4,479,753 | 10/1984 | Thorley | 414/541 |
| 4,499,970 | 2/1985 | Hussey | 414/921 X |
| 4,556,128 | 12/1985 | Thorley et al. | 414/921 X |
| 4,564,086 | 1/1986 | Kingston | 414/921 X |
| 4,576,539 | 3/1986 | Williams | 414/921 X |
| 4,579,503 | 4/1986 | Disque | 414/546 X |
| 4,583,466 | 4/1986 | Reddy et al. | 414/921 X |
| 4,592,695 | 6/1986 | McConnell | 414/921 X |
| 4,606,433 | 8/1986 | Smalley et al. | 414/921 X |
| 4,627,784 | 12/1986 | Collins | 414/540 |
| 4,671,730 | 6/1987 | Gateau | 414/541 X |
| 4,685,858 | 8/1987 | Manning et al. | 414/921 X |
| 4,711,613 | 12/1987 | Fretwell | 414/917 X |
| 4,718,812 | 1/1988 | Smalley et al. | 414/540 |
| 4,808,056 | 2/1989 | Oshima | 414/917 X |
| 4,909,700 | 3/1990 | Fontecchio et al. | 414/921 X |
| 4,958,979 | 9/1990 | Svensson | 414/921 X |

FOREIGN PATENT DOCUMENTS

| | | | |
|---|---|---|---|
| 786,671 | 6/1968 | Canada | 414/540 |
| 2743150 | 4/1979 | Fed. Rep. of Germany | 414/541 |
| 46,731 | 2/1987 | Japan | 414/921 |
| 2055344 | 3/1981 | United Kingdom | 414/540 |

OTHER PUBLICATIONS

Declaration of Dale Kempf (8 pages) regarding Synergetics lift.

Declaration of Paul Reichmuth (2 pages) regarding Synergetics lift.

*Primary Examiner*—David A. Bucci

*Attorney, Agent, or Firm*—Christensen, O'Connor, Johnson & Kindness

[57] ABSTRACT

A wheelchair lift, for tour buses or any bus having an elevated seating area providing room for a compartment beneath the seating area, includes a carriage movable into and out of the compartment. A platform on the carriage is formed by rotating a movable part with respect to a fixed part. A powered linkage between the carriage and the platform raises and lowers the platform. Safety devices such as barriers and handrails are provided.

15 Claims, 8 Drawing Sheets

WHEELCHAIR LIFT FOR TRANSIT VEHICLES HAVING ELEVATED PASSENGER COMPARTMENT FLOOR

TECHNICAL FIELD

This invention relates generally to wheelchair lifts to be used on vehicles. More specifically, it relates to such lifts for use on tour or highway buses or other vehicles, such as railway cars, having a passenger compartment that is sufficiently above the ground to make impractical the use of a conventional stairwell-located wheelchair lift.

BACKGROUND OF THE INVENTION

In recent years there has been a recognized and, therefore, growing need to accommodate the needs of those in wheelchairs on public transportation. To this end, there has a been a large number of devices proposed to provide wheelchair lifts in transit buses—those intended for use on city and suburban streets. Such buses have two features that have shaped the design and location of such lifts on the bus. One is that they are typically not far off the ground or pavement and the other is that they usually have more than one door. Therefore, it has been possible to design wheelchair lifts to be mounted inside one of the doors leaving at least one other door unencumbered. Likewise, because the distances between pavement or curb level and the bus floor level are not excessive, the actuating or raising and lowering means can be mounted adjacent a doorway stairwell and still leave room for the steps and floor space in the vicinity of the steps.

Tour or intercity buses, however, have totally different problems. They are, first of all, much taller than transit buses. In a typical bus, the floor of the bus may be 54 inches above the pavement while the underside of the bus may be 13 inches above the pavement. Similarly, the floor of a railway car may oftentimes be many feet above the floor of an adjacent platform. These distances require a lifting mechanism that cannot easily be contained within the spaces available around the stairwell of such a bus or railway car.

SUMMARY OF THE INVENTION

To solve these problems and at the same time provide a wheelchair lift that is reliable and can be provided with usual safety features, this invention comprises a lfit platform that can be stored in a compartment under the passenger seating area, such as the baggage compartment of a tour bus. In use, the compartmnent door is opened and the platform extended. Fixed rails in the compartment support and guide a movable carriage on which the platform is mounted. The platform includes protective features, such as handrails for use by an occupant, a movable ramp to make contact with the ground surface and to provide a raised barrier when the lift is in motion, and a movable bridging element that functions as a raised safety barrier and provides a connection between the platform and the floor of the vehicle.

BRIEF DESCRIPTION OF THE DRAWINGS

The invention itself is set forth in the claims appended hereto and forming a part of this specification, while an understanding of an embodiment may be had by reference the detailed description taken in conjunction with the drawings in which:

DETAILED DESCRIPTION OF THE PREFERRED EMBODIMENT

Figure 1:
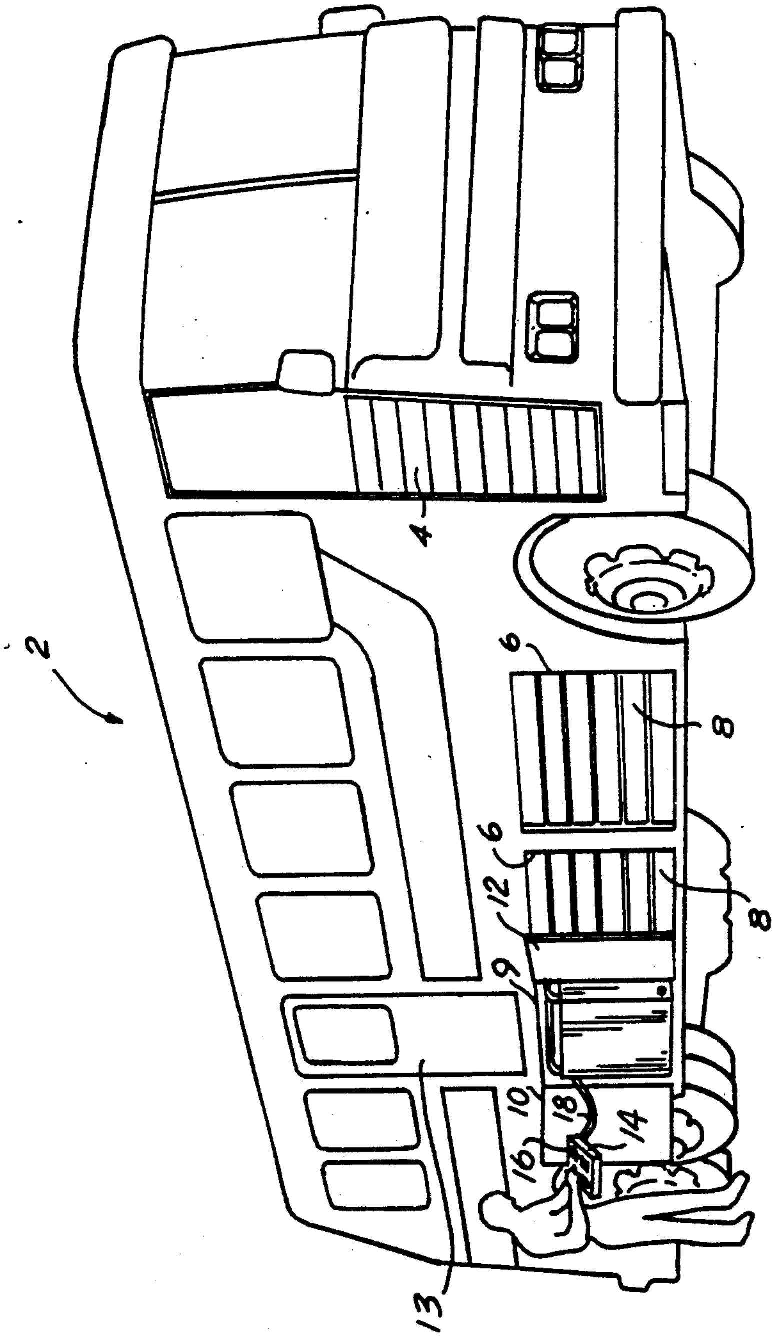
FIG. 1 is a perspective view of a tour bus illustrating how a wheelchair lift, in accordance with the invention, may be installed thereon.
Figure 2:
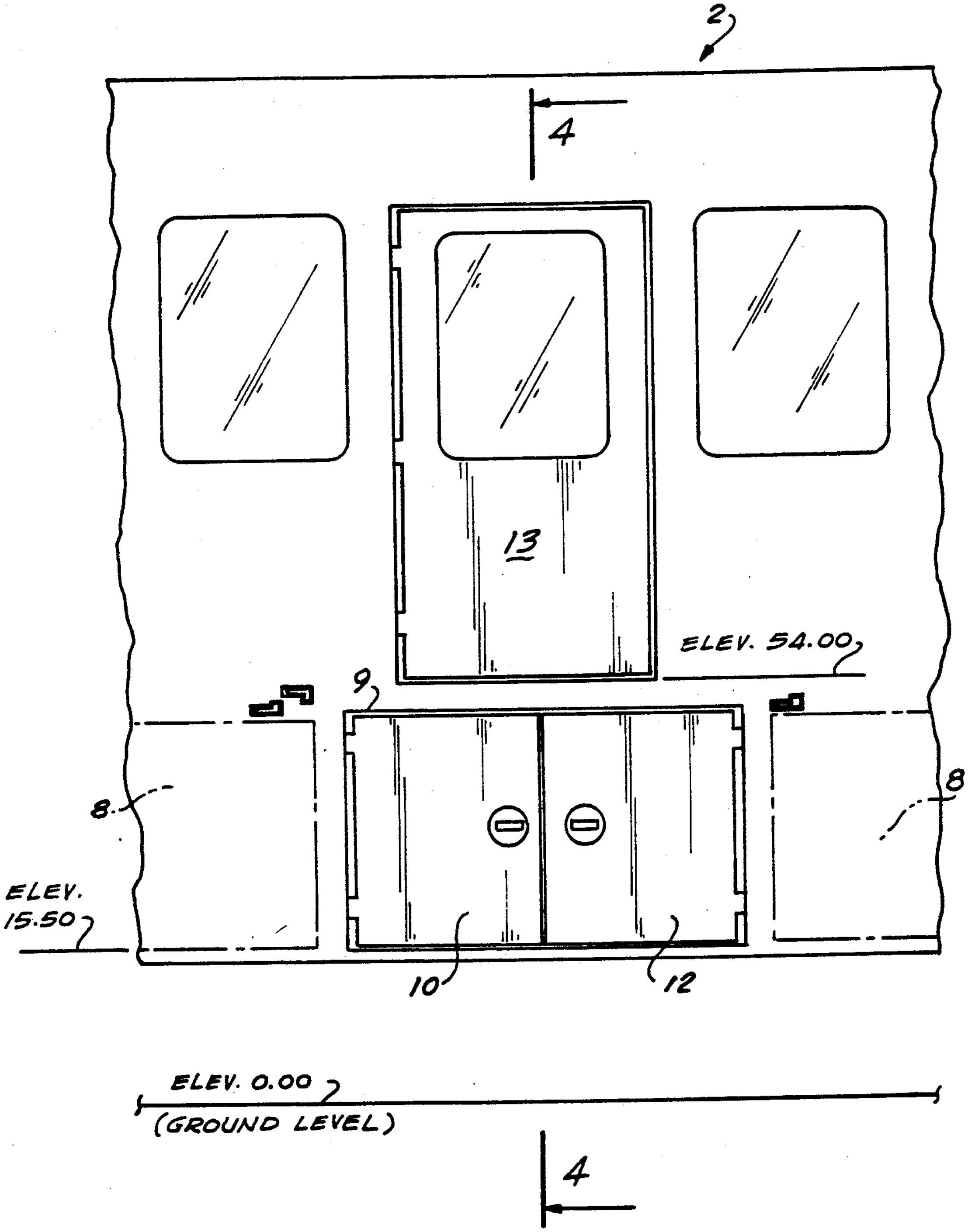
FIG. 2 is a partial side view of a vehicle having an access door and a lift-stowing compartment under that door.

First, having reference to FIG. 1, a wheelchair lift in accordance with the invention is intended for use on a bus 2 of the tour or intercity type. Such a bus is provided with usual windows and a door 4. As is well known, these are higher off the ground than the typical transit bus, for their floors may be 54 inches or more above the ground while their underside may be 13 inches. Such dimensions are provided so that the bus can be provided with a series of baggage compartments 6 spaced along its length. Doors 8, usually opening upwardly on each side of the bus, close the compartments until they are opened to load or unload baggage and other articles.

Because the door 4 and stairwell behind it cannot accommodate a wheelchair lift, it has not been possible heretofore to provide that kind of accommodation on tour buses.

In accordance with this invention, one baggage compartment 9 is dedicated to the stowing of such a lift and the apparatus for raising and lowering it. This compartment may be opened and closed using vertically hinged doors 10 and 12 to swing out of the way when the lift is in operation. An access door 13 is provided in the bus or other vehicle for use when the lift is operated.

In a tour bus the operator's seat is at the front of the bus and, because of the distance between the driver and the lift and his lack of a line of sight to the lift, it is desirable that, when the lift is in operation, he or someone else has a direct view of its operation. Therefore, this invention provides a control panel 14 normally stored within the compartment 9. During operation of the lift the control panel is removed from a storage rack (not shown) and its control buttons 16, connected by a cable 18, are actuated to control the operating sequence described hereinafter.

Figure 3:
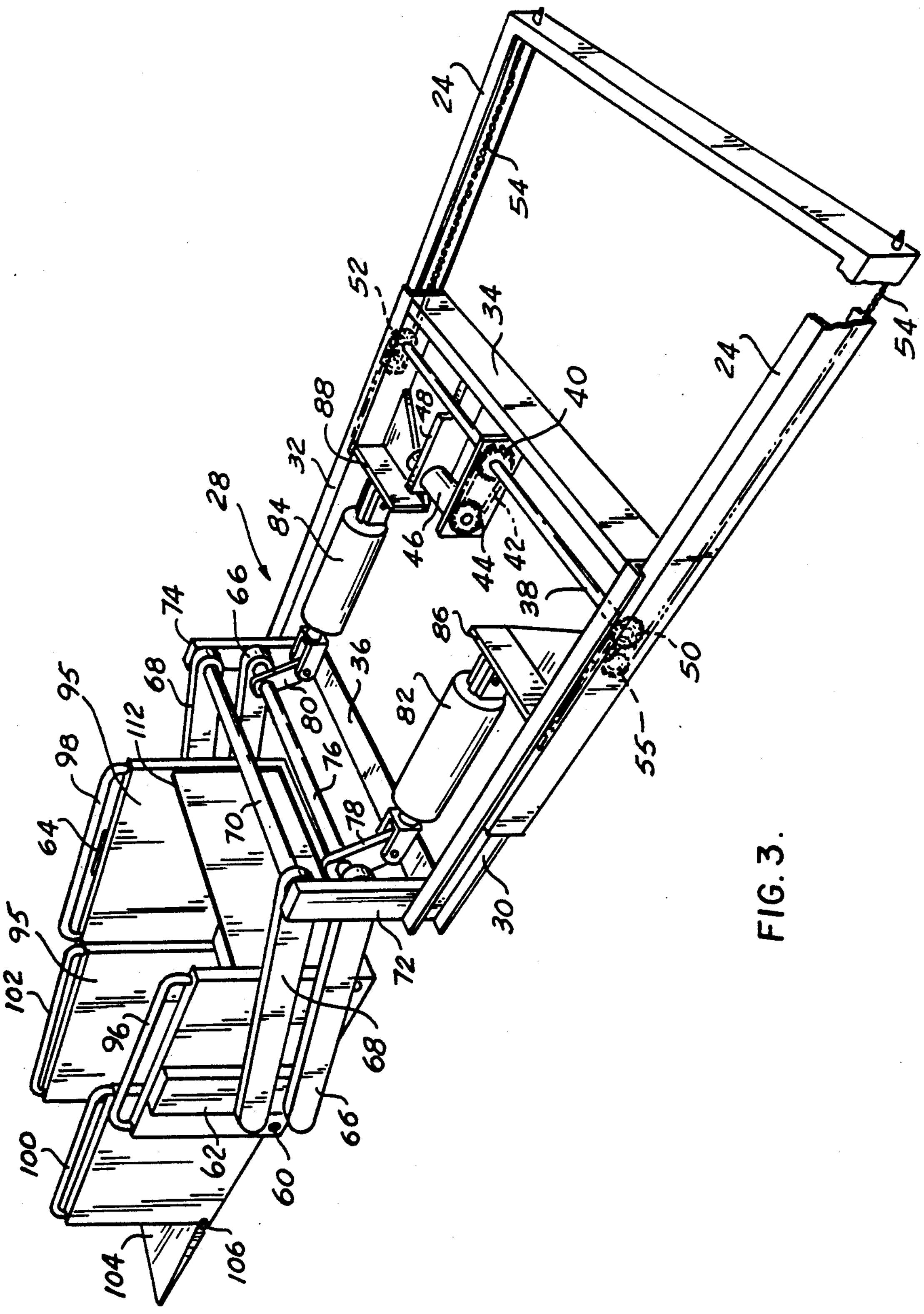
FIG. 3 is an isometric illustration of an embodiment of a lift in accordance with the invention.

FIG. 3 illustrates a preferred embodiment of the invention. A pair of spaced guide and support rails 24 are secured by a suitable means, such as bolts or clamps, to the bottom floor or supported from passenger floor 27, or from both of a stowage compartment. Mounted between the guide rails 24 is a carriage 28 consisting of a pair of spaced channels 30 and 32 and provided at the front and rear end with a pair of transverse channel members 34 and 36 to provide a rigid rectangular structure.

Figure 4:
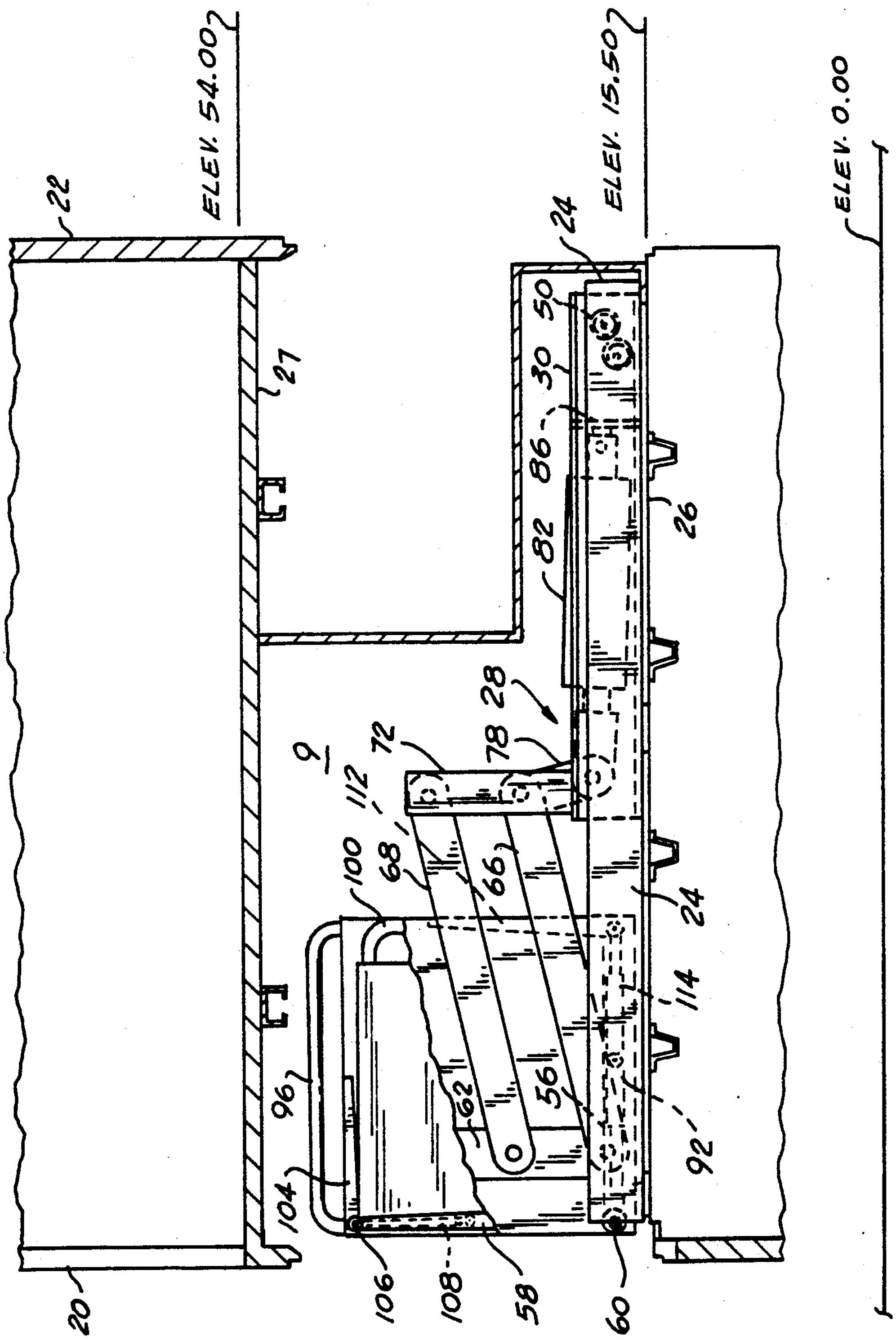
FIG. 4 is a side view of an embodiment of the invention in the stowed position on a bus.

FIG. 4 illustrates the lift in such a stowage compartment in this case on a tour bus. The compartment extends from one side 20 to the other side 22 of the bus. A bottom floor 26 is spaced from a top 27 a sufficient distance to accommodate the lift, having its spaced guide rails secured to one or both of them. At the rear of the carriage an axle 38 extends transversely of the carriage and is rotatably mounted in the channel members 30 and 32. Mounted on the axle is a driven sprocket 40 to which a drive chain 42 is connected. A driving sprocket 44 is driven by a motor 46 mounted on a suitable support 48 secured to the member 34. Propulsion of the carriage, inwardly and outwardly of the compartment 9, is provided by sprockets 50 and 52 secured on opposite ends of the axle 38. The sprockets engage between the links of chains 54 secured at one end to the guide rails 24. The chains are then passed around idler sprockets 55 mounted on the channel rails 30 and 32, around the sprockets 50, 52, and then are secured to guide rails 24. Upon actuation of the motor 46, the axle 38 will cause the sprockets 50 and 52 to rotate to move the carriage inwardly or outwardly depending upon the direction of rotation of the motor.

Figure 5:
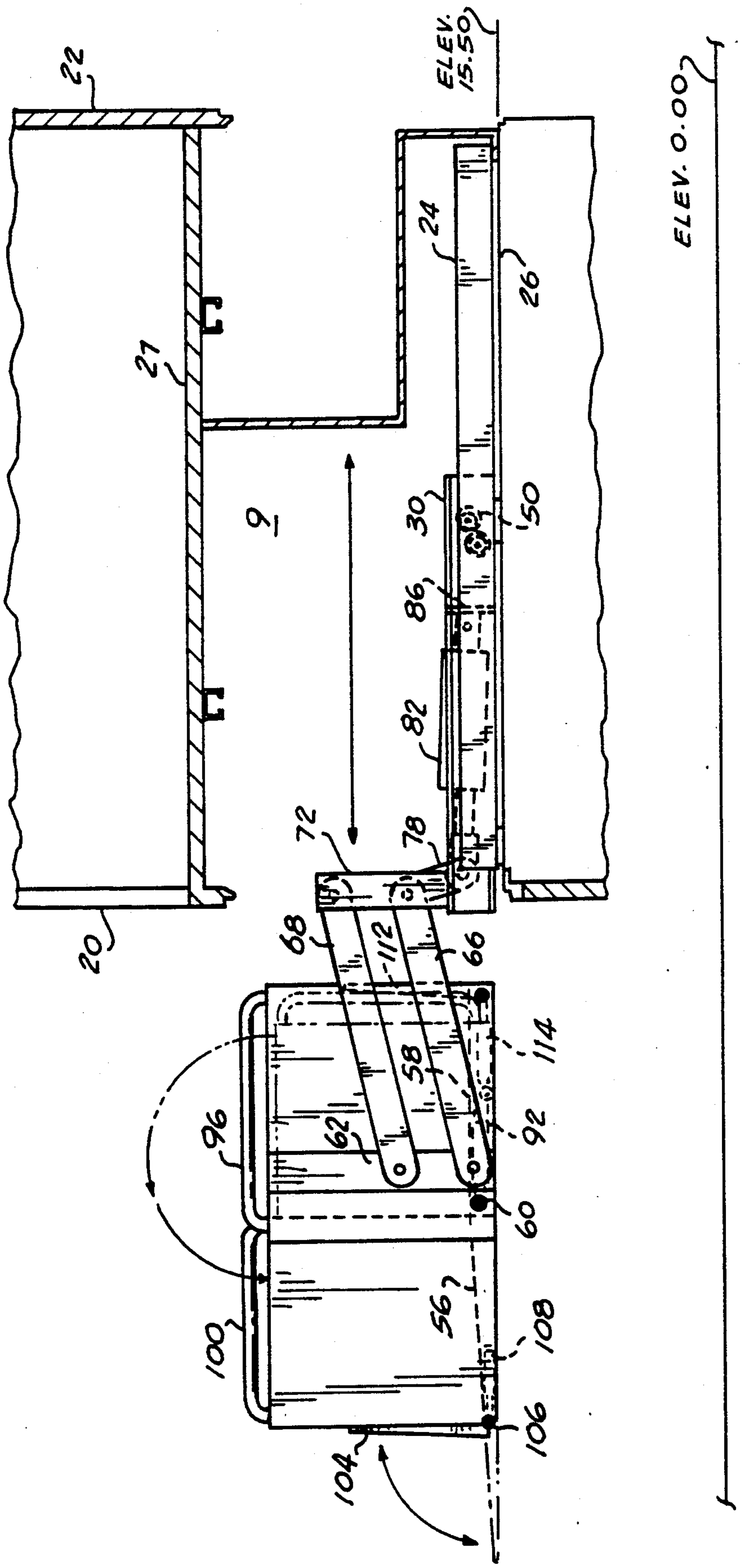
FIG. 5 is a side view of the embodiment of FIG. 3 in the deployed position.
Figure 6:
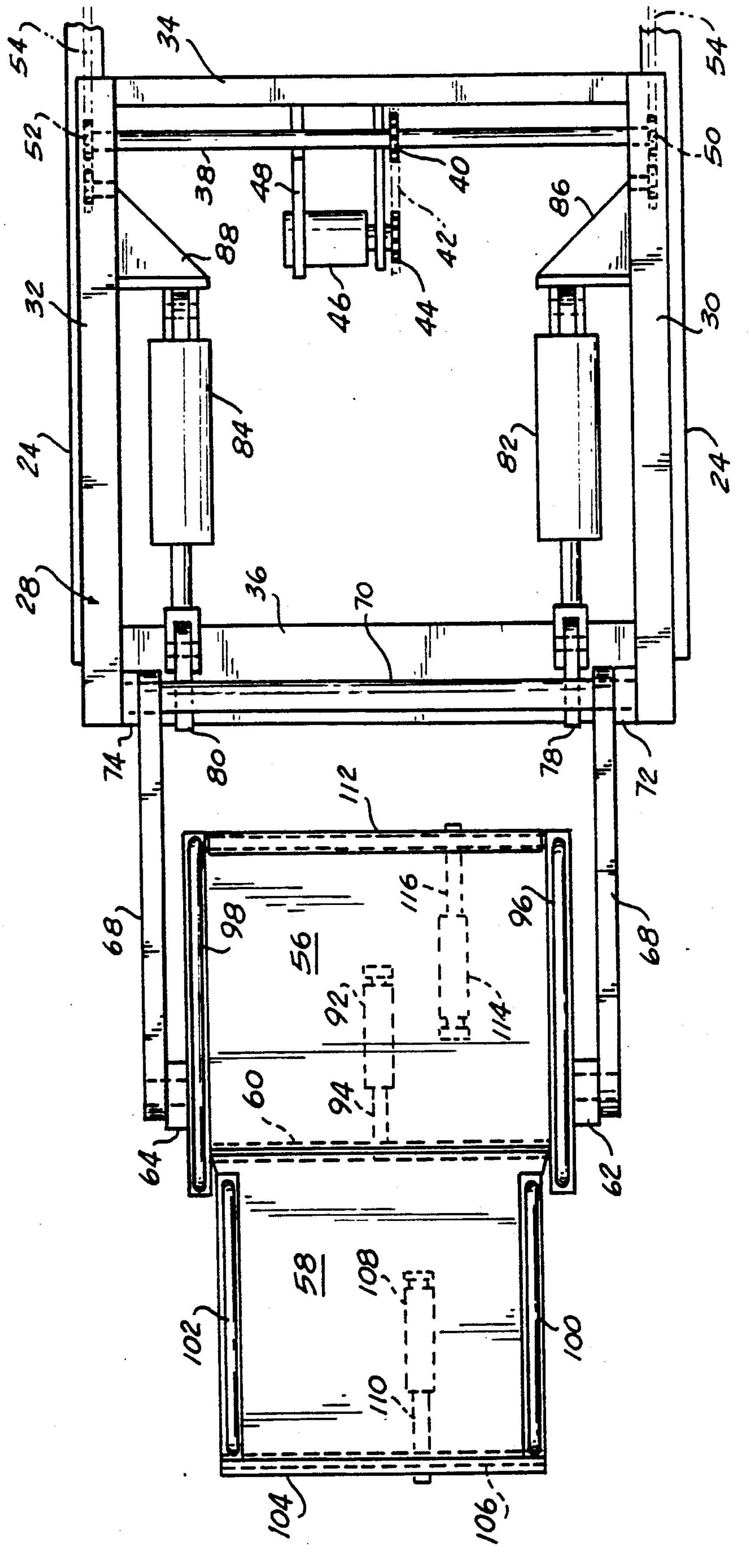
FIG. 6 is a plan partially in section showing the embodiment of FIG. 2 in the deployed position.

A lift platform, consisting of a fixed platform 56 and an articulating platform 58, is mounted on the carriage 28 (see FIGS. 4 and 5). The articulating platform is pivotally mounted at 60 to the fixed platform secured to a pair of vertically extending forward arms 62 and 64. The forward arms 62 and 64 are secured by welding or any other suitable means to the fixed platform 56.

Pivotally connected to the forward arms 62 and 64 are a pair of lifting links 66, while a pair of stabilizing links 68 are pivotally connected to those arms above the lifting links. The stabilizing links 68 at their distal ends are secured to a tube 70 rotatably mounted on a pin in turn mounted on a pair of rearward vertically extending arms 72 and 74 secured to the carriage 28 and function to maintain the platform in a horizontal position at all times during stowage and operation. The lifting links 66 at their distal ends are secured to a tube 76, rotatably mounted on a pin fixedly mounted on the rearward arms 72 and 74, and actually provide the lifting and lowering force for the platform.

This lifting force derives form a pair of crank arms 78 and 80 secured to the tube 76. The crank arms are rotated by hydraulic actuators 82 and 84, having their cylinders pivotally mounted on brackets 86 and 88, respectively, attached to the channels 30 and 32. Thus, as the pistons in the acutators 82 and 84 are extended, the crank arms 78 and 80 will rotate in the clockwise direction as shown in the drawing. This will cause the rotation of the shaft 76 and, in turn, the lifting links 66, to raise the platform to bus floor 27. As the pistons of the actuators are retracted, the crank arms 78 and 80 will rotate counterclockwise to lower the platform first to the level of the floor 26 and then to ground level.

The platform, as stated, consists of two parts, a fixed part 56 and a movable part 58. As may be seen in FIG. 4, the movable part 58 in the stowed position is attached to the fixed part 56 by a hinge 60, about which it may rotate, and extends upwardly at about 90° to the plane of the fixed platform. When the platform is deployed, a hydraulic actuator 92, having its piston rod 94 connected to a lever (not shown) on the underside of the platform 58 and the end of its cylinder connected to the underside of the platform 56, is actuated to retract the piston 94 and cause the platform 58 to rotate about 90° to extend in approximately the same plane as the fixed platform 56, whereby a longer substantially horizontal platform is created sufficient in length and width to accommodate a wheelchair.

To provide protection and a sense of security for a person in a wheelchair while on the lift, a number of features are provided.

The first of these are protective side panels 95 on opposite sides of the platform to protect passengers from pinch points as links pass by the platform. Another safety feature is protective railings on opposite sides of the platform. A pair of such railings 96 and 98 extend upwardly on oppostie sides of the fixed platform 56, both in the stowed and deployed positions. Another pair, 100 and 102, of such railings extend substantially horizontally on the movable platform 58 when the lift is in the stowed position (see FIG. 4) but when that platform is rotated about 90° to the deployed position, they extend upwardly (see FIG. 5).

Another safety feature is the provision of a curbside barrier 104. This barrier extends substantially horizontally over the fixed platform when the lift is in the stowed position (see FIG. 4) but extends upwardly from the movable platform 58 when the lift is in the initial stow deploy position (see FIG. 3). A hinge 106 pivotally connects the barrier 104 to the movable platform 58 and has connected thereto a lever arm. A hydraulic actuator 108 has its piston 110 connected to the lever arm so that, when the piston retracts, the barrier 104 will rotate counterclockwise to engage the ground or curb to provide a ramp, permitting a wheelchair to be rolled onto the platform created by platforms 56 and 58.

Another safety feature is a rear barrier 112 pivotally mounted on the fixed platform 56. It is rotated by a hydraulic actuator 114 having a piston 116 connected to a lever arm on its underside. In the stowed and deployed positions, the barrier extends upwardly from the fixed platform 56 and remains so until the platform reaches the level of the bus floor 27. At that point the piston 116 retracts, pivoting the barrier 112 clockwise so that it forms a bridge between the platform and bus floor 27, permitting easy movement of the wheelchair from the platform into or out of the interior of the bus.

The operation of the illustrated embodiment of the wheelchair lift can be seen in the FIGS. 4 through 8. In FIG. 4 the lift is in the stowed position completely within the confines of a bus baggage compartment. In this position the movable platform 58 extends upwardly at the outer end of the fixed platform 56. The railings 100 and 102 extend horizontally into the baggage compartment, as does the barrier 104. At the same time, the barrier 112 extends upwardly from the fixed platform 56 at its inner end.

In FIG. 5 the lift has been deployed by operation of the motor 46, propelling the carriage 28 outwardly on the guide and support rails 24. When outward of the bus, the actuator 92 is operated to rotate the movable platform 58 90° counterclockwise to form the wheelchair platform as it is aligned with the fixed platform 56. At this stage, both barriers 104 and 112 extend vertically upward.

Figure 7:
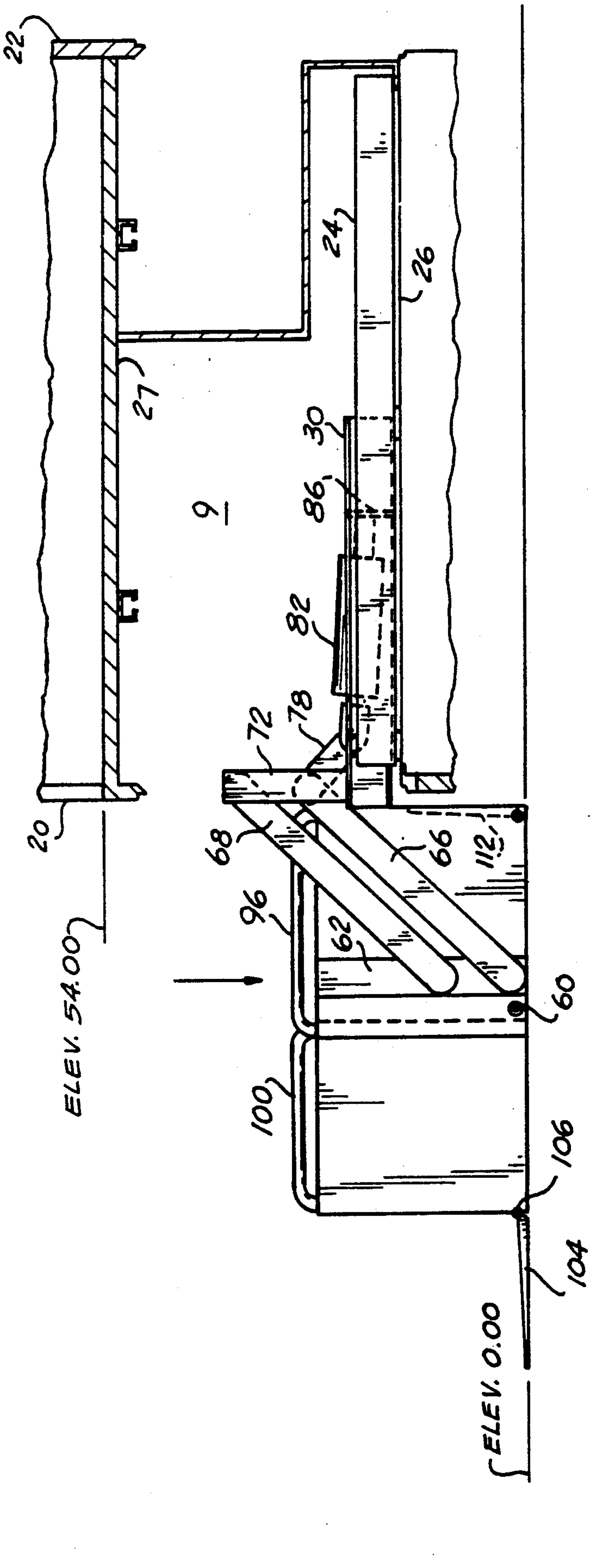
FIG. 7 is a side view showing the embodiment of FIG. 3 at ground level.

FIG. 7 illustrates the lift in the ground-engaging position where a wheelchair may enter or leave the lift. This position was achieved by operating the hydraulic actuators 82 and 84 to retract their pistons. When operated, the crank arms 78 and 80 were rotated counterclockwise as were the lifting links 66. The platform remained at all times in its horizontal orientation because of the engagement of the stabilizing links 68 between forward vertical arms 62, 64 and the rearward vertical arms 72, 74. At an appropriate point the actuator 108 was operated to rotate the barrier 104 counterclockwise so as to form a ramp for entry and exit of a wheelchair onto the platform. A sensor to indicate contact with the ground is not shown but is provided to stop the downward motion of the lift. The barrier 112 remains in its upward position. After entry of a wheelchair onto the lift, the actuator 108 rotates the barrier 104 to a vertical position so that, with the barrier 112 in the upward position forward or reverse, movement of a wheelchair on the lift is limited as a safety feature. Other safety features are the handrails 96 and 98 and the handrails 100 and 102, which were extended to a vertical position when the movable platform 58 was rotated to the horizontal position.

Figure 8:
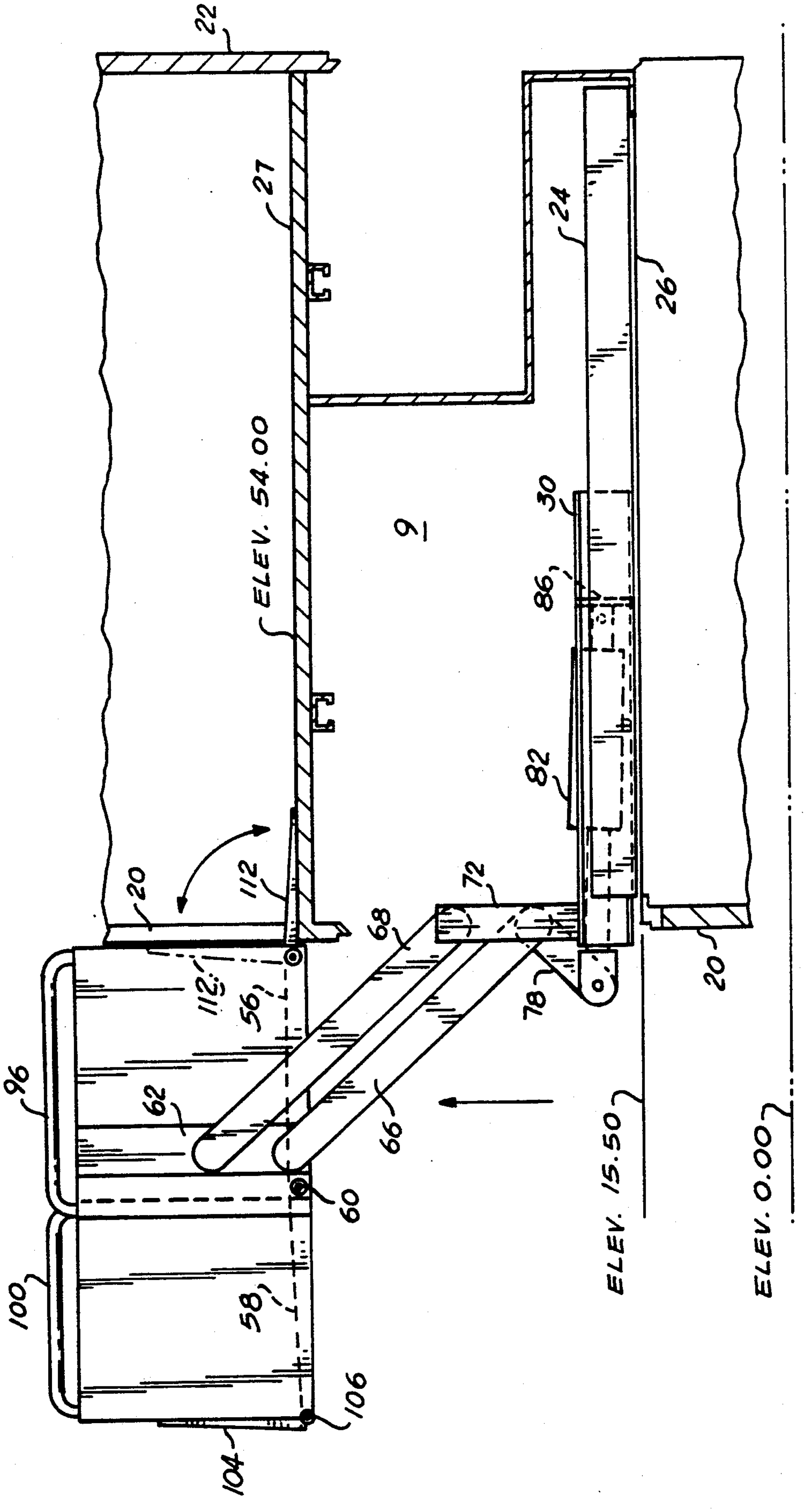
FIG. 8 is a side view showing the embodiment of FIG. 3 at the level of the bus floor.

In FIG. 8 the lift has been raised to the level of the bus floor 27 by extending the pistons in the actuators 82 and 84 to receive or permit the exit of a wheelchair. In this position, barrier 112 is rotated clockwise to form a bridge connecting the platform to the bus floor so that a wheelchair may be easily rolled into and out of the bus.

If the door 13 is one that slides to one side of the door opening a further safety feature is provided. As the lift is raised upwardly it may be stopped a short distance below the bottom of the door opening to allow the door to be opened. Interlocking means may be provided to prevent the door 13 from opening until the lift has reached the distance just below the bottom of the door. When the door is then opened a person stepping out of the door would be stepping onto the lift platform.

To lower a wheelchair to the ground or to stow the lift it back in the bus baggage compartment all of the above-described operations are reversed.

All of the foregoing operations are carried out by an operator using the controls provided on the panel 14 and take place under his direct observation.

While hydraulic actuators have been shown and described, other actuators, such as air, could be used as could electric motors and gear arragnements connected to the various rotating elements. Likewise, it is possible that other lifting linkages could be used to raise and lower the platform. While the invention has been described with reference to its installation on a tour or intercity bus, it is applicable to any type of transit vehicle, such as a railway car, in which the passenger floor is elevated above the ground or platform floor by a considerable distance.

The foregoing and other modifications could be made in the practice of the invention and it is intended, by the claims appended hereto, to cover all such variations as come within their scope.

What is claimed as new and desired to be secured by Letters Patent is:

1. A wheelchair lift, for use on a transit vehicle having an enclosed compartment under the passenger seating area, the lift comprising:

support means to be secured to the compartment;

a movable carriage slidably mounted on said support means;

means coupled with said carriage for causing said carriage to move along said support means between an extended position and a retracted position;

a platform mounted on said carriage, said platform comprising a fixed portion having a horizontal first surface and an outer edge and a movable portion having a second surface, said movable portion being pivotally mounted to said fixed portion at said outer edge so as to be movable (a) downwardly and outwardly from (1) a first position wherein said second surface extends substantially vertically to (2) a second position wherein said first surface extends substantially parallel to said second surface, and (b) upwardly and inwardly from (1) said second position to (2) said first position, further wherein said fixed portion includes a first pair of handrails extending upwardly from said first surface on opposite sides of said fixed portion, and said movable portion includes a second pair of handrails extending upwardly from said second surface on opposite sides of said movable portion, said first and second pairs of handrails being affixed, respectively, to said fixed and movable portions so as to remain in said upwardly extending relation therewith when said movable portion is in said first position, said second position, or is being moved between said first and second positions, said fixed and movable portions of said platform and said first and second handrails being sized and configured so as to permit said platform to be received entirely within the compartment of the transit vehicle when said carriage is in said retracted position and said movable portion is in said first position;

means coupled with said movable portion for causing said movable portion to move between said first and second positions when said carriage is in said extended position; and means coupled to said platform for lowering said platform to the ground and raising it to a level of the passenger seating area.

2. The wheelchair lift of claim 1, further comprising a forward barrier pivotally attached to an outer edge of said movable portion so as to be movable between a first position wherein said forward barrier extends substantially perpendicular to said second surface and a second position wherein said forward barrier extends substantially parallel to said second surface and means for rotating said forward barrier between said first and second positions.

3. The wheelchair lift of claim 1, further comprising a rearward barrier pivotally attached to an inner edge of said fixed portion so as to be movable between a first position wherein said rearward barrier extends substantially perpendicular to said first surface and a second position wherein said rearward barrier extends substantially parallel to said first surface and means for rotating said rearward barrier between said first and second positions.

4. The wheelchair lift of claim 1, wherein said means for lowering and raising said platform comprises:

forward vertically extending arms on opposite sides of said platform;

rearward vertically extending arms on opposite sides of said carriage;

first and second lifting links, each pivotally connected at one end to one of said forward arms and at an opposite end to one of said rearward arms; and means for causing said first and second lifting links to pivot about said opposite ends in either a clockwise or counterclockwise direction.

5. The wheelchair lift of claim 4, wherein said means for causing said first and second lifting links to pivot comprises at least one crank arm secured thereto and extending therefrom, and actuating means connected between said at least one crank arm and said carriage to rotate said crank arm.

6. The wheechair lift of claim 5, including a shaft extending between said rearward arms connecting said lifting links to each other.

7. The wheelchair lift of claim 5, including first and second stabilizing links, each pivotally connected at one end to said forward arms and at an opposite end to said rearward arms.

8. The wheelchair lift of claim 6, wherein said actuating means comprises at least one hydraulic actuator connected between said at least one crank arm and said carriage.

9. The wheelchair lift of claim 1, wherein said support means comprises a pair of spaced-apart rails to be secured in the compartment and wherein said carriage comprises a rectangular frame movable on said rails.

10. The wheelchair lift of claim 8, wherein said carriage includes a frame and said means for moving said carriage between said extended and retracted positions comprises a drive shaft rotatably mounted on said frame, motor means connected to said drive shaft for rotating it in either a forward or reverse direction, and at least one drive assembly connected to said drive shaft and said support means for converting rotational motion of said drive shaft into linear motion and for transmitting said linear motion to said carriage so as to cause said carriage to move between said extended and retracted positions.

11. The wheelchair lift of claim 10, wherein said drive assembly includes a drive element and at least one element attached to said carriage and said support means and wherein said drive element engages said at least one toothed element.

12. A lift according to claim 1, wherein the lift is sized so as to be received entirely within the compartment of the vehicle when said carriage is in said retracted position.

13. A wheelchair lift, for use on a transit vehicle having an enclosed compartment under the passenger seating area, the lift comprising:

support means securable to the compartment;

a carriage slidably mounted on said support means so as to be movable between an extended position and a retracted position;

a platform attached to said carriage, said platform comprising a fixed portion having a horizontal first surface and an outer edge and a movable portion having a second surface, said movable portion being pivotally mounted to said fixed portion at said outer edge so as to be movable (a) downwardly and outwardly from (1) a first position wherein said second surface extends substantially vertically to (2) a second position wherein said second surface extends substantially parallel to said first surface and (b) upwardly and inwardly from said (1) second position to (2) said first position;

further wherein said movable portion includes an outer edge and a front barrier having a third surface, said front barrier being pivotally mounted to said movable portion adjacent to its outer edge so as to be movable (a) outwardly from (1) a first position wherein said third surface extends substantially perpendicular to said second surface to (2) a second position wherein said third surface extends substantially parallel to said second surface and (b) inwardly from (1) said second position to said (2) first position;

wherein said fixed and movable portions of said platform and said front barrier are sized and configured so as to permit said platform to be received entirely within the compartment of the transit vehicle when said carriage is in said retracted position, said movable portion is in said first position and said from barrier is in said first position;

means coupled with said carriage for causing said carriage to move along said support means between said extended and retracted positions; and means coupled with said movable portion for causing said movable portion to move between said first and second positions when said carriage is in said extended position.

14. A lift according to claim 13, further comprising a rearward barrier pivotally attached to an inner edge of said fixed platform so as to be movable between a first position wherein said rearward barrier extends substantially perpendicular to said first surface and a second position wherein said rearward barrier extends substantially parallel to said first surface and means for rotating said rearward barrier between said first and second positions.

15. A lift according to claim 13, further wherein said fixed portion comprises a first pair of handrails extending upwardly from said first surface on opposite sides of said fixed portion, and said movable portion includes a second pair of handrails extending upwardly from said second surface on opposite sides of said movable portion, said first and second pairs of handrails being affixed respectively, to said fixed and movable portions so as to remain in said upwardly extending relation therewith when said movable platform is in said first position, said second position, or is being moved between said first and second positions.

* * * * *

UNITED STATES PATENT AND TRADEMARK OFFICE

CERTIFICATE OF CORRECTION

PATENT NO. : 5,110,252

DATED : May 5, 1992

INVENTOR(S) : L. Aoki

It is certified that error appears in the above-identified patent and that said Letters Patent is hereby corrected as shown below:

| COLUMN | LINE | ERROR |
|---|---|---|
| 1 | 49 | "lfit" should be --lift-- |
| 1 | 52 | "compartmnent" should be --compartment-- |
| 3 | 44 | "form" should be --from-- |
| 3 | 49 | "acutators" should be --actuators-- |
| 4 | 12 | "oppostie" should be --opposite-- |
| 5 | 41 | "arragnements" should be --arrangements-- |
| [56] | 16th Reference | "4,124,097 11/1978 Kawks et al." should be --4,124,097 11/1978 Hawks et al.-- |

Signed and Sealed this

Fifth Day of October, 1993

*Attest:*

BRUCE LEHMAN

*Attesting Officer* *Commissioner of Patents and Trademarks*